(No Model.)

O. AVERY.
HOUSEHOLD IMPLEMENT.

No. 491,919.　　　　　　　　　　Patented Feb. 14, 1893.

Witnesses—
Geo. E. Frech.
Rol. A. Fitzgerald.

Inventor—
Oliver Avery
per
Lehmann Patterson & Nesbit
attys.

United States Patent Office.

OLIVER AVERY, OF GROTON, NEW YORK, ASSIGNOR TO DUNCAN McLACHLAN, OF SAME PLACE, AND J. W. ALLEN, OF RICHFORD, NEW YORK.

HOUSEHOLD IMPLEMENT.

SPECIFICATION forming part of Letters Patent No. 491,919, dated February 14, 1893.

Application filed September 23, 1892. Serial No. 446,745. (No model.)

*To all whom it may concern:*

Be it known that I, OLIVER AVERY, of Groton, in the county of Tompkins and State of New York, have invented certain new and useful Improvements in Household Implements; and I do hereby declare the following to be a full, clear, and exact description of the invention, such as will enable others skilled in the art to which it pertains to make and use it, reference being had to the accompanying drawings, which form part of this specification.

My invention relates to improvements in household implements, and it relates particularly to an implement for cutting into fine pieces all kinds of vegetables and meats, and which is also adapted to be used as a meat tenderer.

The primary object of my invention is to provide an implement of the class mentioned, which is composed of a central stem or handle portion, and blades constructed as hereinafter shown and described, whereby the stem is cast around the blades, for securing the blades thereto in a cheap and effectual manner, and to so construct the blades that they leave a central opening for a purpose which will be fully set forth hereinafter.

A further object of my invention is to provide a cleaner for the blades, which is constructed substantially in the manner hereinafter shown and described.

Figure 1:
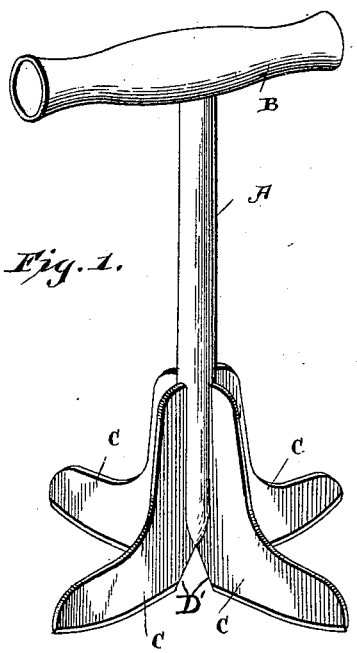
Figure 2:
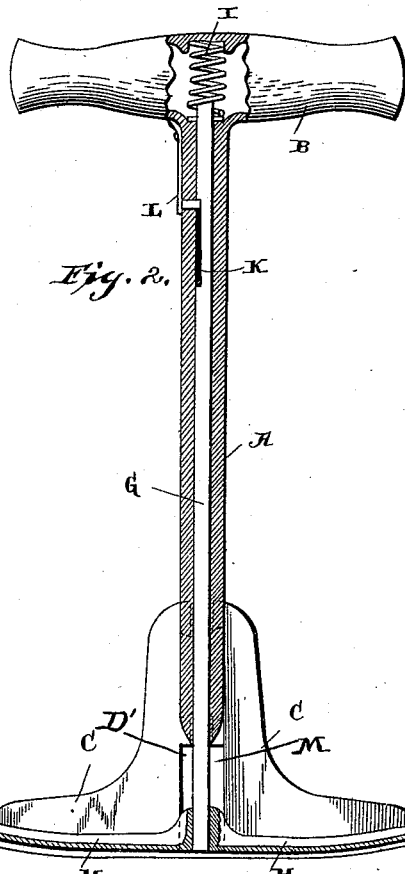
Figure 4:
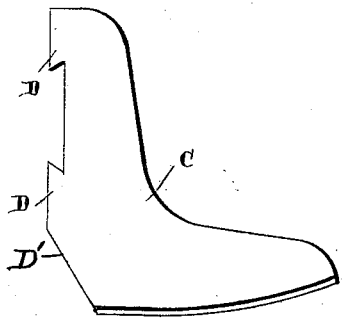
Figure 3:
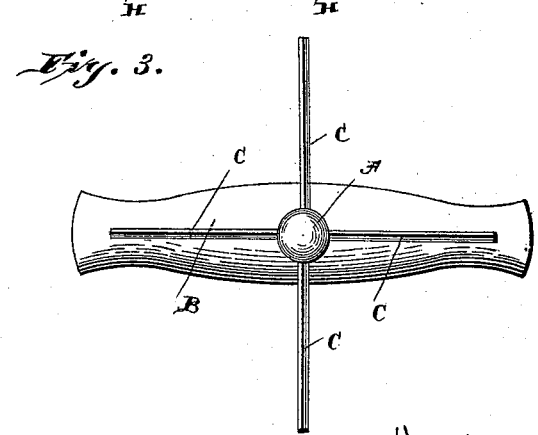

In the accompanying drawings:—Figure 1 is a perspective view of my invention. Fig. 2 is a vertical section of my invention showing the cleaner attached thereto. Fig. 3 is an inverted plan view of Fig. 1. Fig. 4 is a detached view of one of the cutting blades.

A represents a metal stem having at its upper end a handle B. The cutting blades C, are provided at their inner edges with a projecting portion or portions D, which extend into the stem as illustrated. These blades are secured to the stem by means of casting the stem thereto. This method makes an exceedingly cheap manner of securing the blades to the stem, and they are rigidly held thereby.

As shown in Fig. 4 the inner edge of the blade preferably has several projections, but I do not limit myself to this particular construction, for the inwardly projecting edge may be provided with holes through which the molten metal will pass, thus holding the blades firmly in place upon the lower end of the stem.

Attention is called to the fact that the lower inner edges of the blades are cut away to form a central opening D'. This is quite essential, for the reason that if the blades extend to the center of the implement and against each other, then at this central point there is a large cutting surface which cannot be readily forced through the material being cut, as will be readily understood. Where however, the inner edges of the blades are cut away as shown, a central opening D' is formed, and the blades are easily forced down through the material being cut, and the effectiveness of the implement greatly increased.

As shown in Figs. 1 and 4, the lower inner edges of the blades are cut away at an angle inward, which forms a V- or U-shaped central opening. This particular kind of opening is necessary where cleaners are not used, as shown in Fig. 2. The reason of this is, that if the opening was made the same size all the way up, the material being cut would clog in the opening, and very greatly retard the cutting of the blades, by preventing them from being forced down. Where the opening however is made in the form of an inverted V as shown in Figs. 1 and 3, the cut material is prevented from clogging in the said opening, for its tendency is to clear itself of the cut material when the implement is forced down. As shown the under edges of the blades are preferably made slightly rounding, so that the implement is capable of being used in bowls, and other similar vessels, in which the material to be chopped is usually placed. I here show four blades, but it will be understood that the number of blades used does not in any manner affect my invention, for as many as eight may be used if so desired.

Referring now to Fig. 2, the stem E, is made hollow, and passing through the stem is a rod G. Connected to the lower end of this rod is a set of cleaners H, which extend between and fill up the space between the blades. The handle portion B' is made hollow also, and placed within this hollow handle or within the stem is a vertical spiral spring I, against which the upper end of the said rod rests, and which spring normally holds the rod down. Made in the rod at a suitable point between its ends in any suitable manner is a recess K, into which the inner end of an inwardly pressing spring L, passes. This spring L has one end held to the stem or handle at its outer side, and has its free end passing through an opening in the stem and into the recess in the rod. The spring pressing inward engages the shoulders formed by the recess L, and the rod is prevented from passing out of the stem, and is limited in its outward movement so that the cleaners are at about the cutting edges of the blades. When the implement is forced down for cutting, the cleaners are forced up by the material being forced between the blades, and then when the implement is raised the cleaners are forced down by the spring, and the chopped material forced from the blades. In this instance the blades are still cut out at their inner lower edges to form a central opening M, as in Fig. 2, and for the same purpose, except the opening is not then necessarily V-shaped, for the cleaners prevent any clogging in the said opening.

In order to remove the cleaners to be themselves cleaned, it is only necessary to pull outward upon the spring, when the rod and with it the cleaners can be removed, and then quickly replaced by pushing the rod back within the stem as will be seen.

From the description herein given, it will be seen that I have produced a chopper which is exceedingly simple in construction, cheap to manufacture, and very effective in its results.

In Fig. 1 a cleaner is not used, and is not generally necessary, but in some cases it may be found desirable to use cleaners, and especially so when the opening is not V-shaped. The object of the opening however has been already particularized. The handle and stem in Fig. 1 may or may not be made hollow as convenience may dictate.

Having thus described my invention, what I claim is:—

A chopping implement comprising a hollow stem, cutting blades extending radially from the lower end thereof and separated to form a central recess, a rod passing between the blades and up into the stem, a spring within the stem for forcing the rod outward, a stop for limiting the outward movement thereof, and angular cleaners secured to and extending radially from the lower end of the rod and between the cutting blades, substantially as described.

In testimony whereof I affix my signature in presence of two witnesses.

OLIVER AVERY.

Witnesses:
WM. A. EASTERDAY,
ROLAND A. FITZGERALD.